United States Patent
Chiang et al.

(10) Patent No.: US 12,423,645 B2
(45) Date of Patent: Sep. 23, 2025

(54) CONTAINER UTILIZATION

(71) Applicant: BlueX Trade, Inc., Diamond Bar, CA (US)

(72) Inventors: Vivian Chiang, Taipei (TW); Huang-Yu Lin, Taipei (TW); Sean O'Malley, Taipei (TW)

(73) Assignee: BlueX Trade, Inc., Diamond Bar, CA (US)

( * ) Notice: Subject to any disclaimer, the term of this patent is extended or adjusted under 35 U.S.C. 154(b) by 150 days.

(21) Appl. No.: 17/521,491

(22) Filed: Nov. 8, 2021

(65) Prior Publication Data

US 2022/0147925 A1  May 12, 2022

Related U.S. Application Data

(60) Provisional application No. 63/111,620, filed on Nov. 9, 2020.

(51) Int. Cl.
*G06Q 10/0835* (2023.01)
*G06Q 10/0631* (2023.01)
(Continued)

(52) U.S. Cl.
CPC ... *G06Q 10/0835* (2013.01); *G06Q 10/06315* (2013.01); *G06Q 10/0838* (2013.01); *G06Q 10/20* (2013.01)

(58) Field of Classification Search
None
See application file for complete search history.

(56) References Cited

U.S. PATENT DOCUMENTS

2005/0278063 A1    12/2005  Hersh
2007/0139197 A1*   6/2007   Hopman ............... G06Q 10/08
                                                      340/568.1
(Continued)

FOREIGN PATENT DOCUMENTS

CN            112997205 A  *  6/2021   ....... G06Q 10/08345
WO    WO-2006036898 A2  *  4/2006   ............ G06Q 10/08
WO         2022099127 A2     5/2022

OTHER PUBLICATIONS

Parijat Dube et al., Simulation Based Analytics for Efficient Planning and Management in Multimodal Freight Transportation Industry, 2014, Proceedings of the 2014 Winter Simulation Conference (Year: 2014).*

(Continued)

*Primary Examiner* — Jerry O'Connor
*Assistant Examiner* — Matthew H Divelbiss
(74) *Attorney, Agent, or Firm* — Ahmann Kloke LLP

(57) ABSTRACT

Transparent end-to-end freight management is disclosed. A system for transparent end-to-end freight management can include carrier devices, cargo endpoint devices, teleconnected containers, a container and transport parameter provisional allocation engine, a transparent container and transport parameter disposition engine, a freight forwarding oversight engine, a container maintenance engine, and national customs office devices. The system can also include a carrier datastore, a shipper datastore, a recipient datastore, a container datastore, a third party datastore, a mode/route datastore, a contract datastore, a transport state datastore, a container state datastore, and a third party state datastore.

10 Claims, 8 Drawing Sheets

(51) Int. Cl.
*G06Q 10/083* (2024.01)
*G06Q 10/20* (2023.01)

(56) References Cited

U.S. PATENT DOCUMENTS

| | | | |
|---|---|---|---|
| 2018/0075408 A1* | 3/2018 | Subramanian ... | G06Q 10/08345 |
| 2018/0347895 A1 | 12/2018 | Jonsson | |
| 2020/0034788 A1* | 1/2020 | Ynion, Jr. ........ | G06Q 10/08345 |
| 2020/0134551 A1* | 4/2020 | Singh ................ | G06Q 10/0831 |

OTHER PUBLICATIONS

European Application No. 21890234.4, Exended European Search Report dated Mar. 12, 2024.

* cited by examiner

CONTAINER UTILIZATION

DETAILED DESCRIPTION

Figure 1:
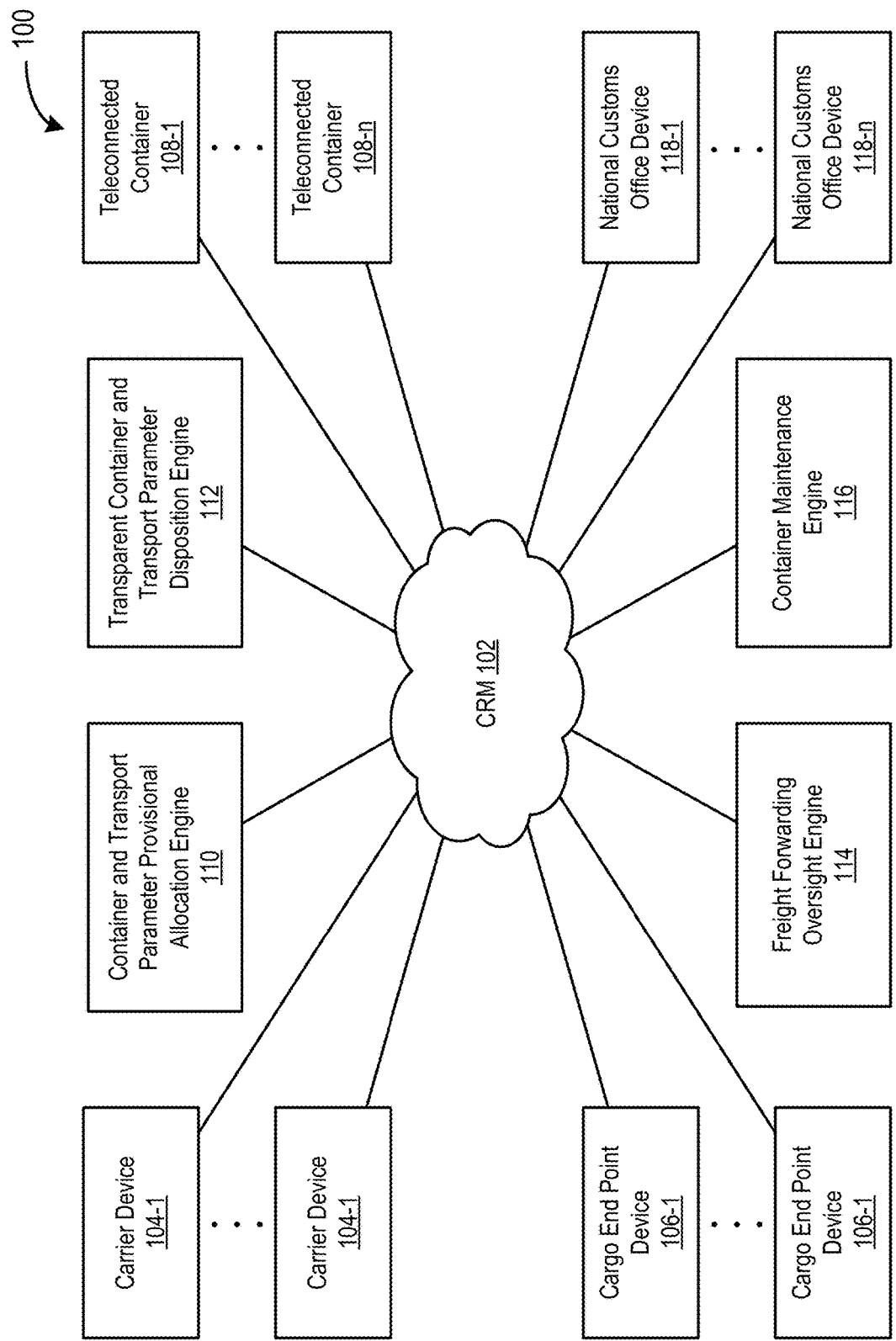
FIGS. 1 and 2 are diagrams of an example of a transparent end-to-end freight management system.
Figure 2:
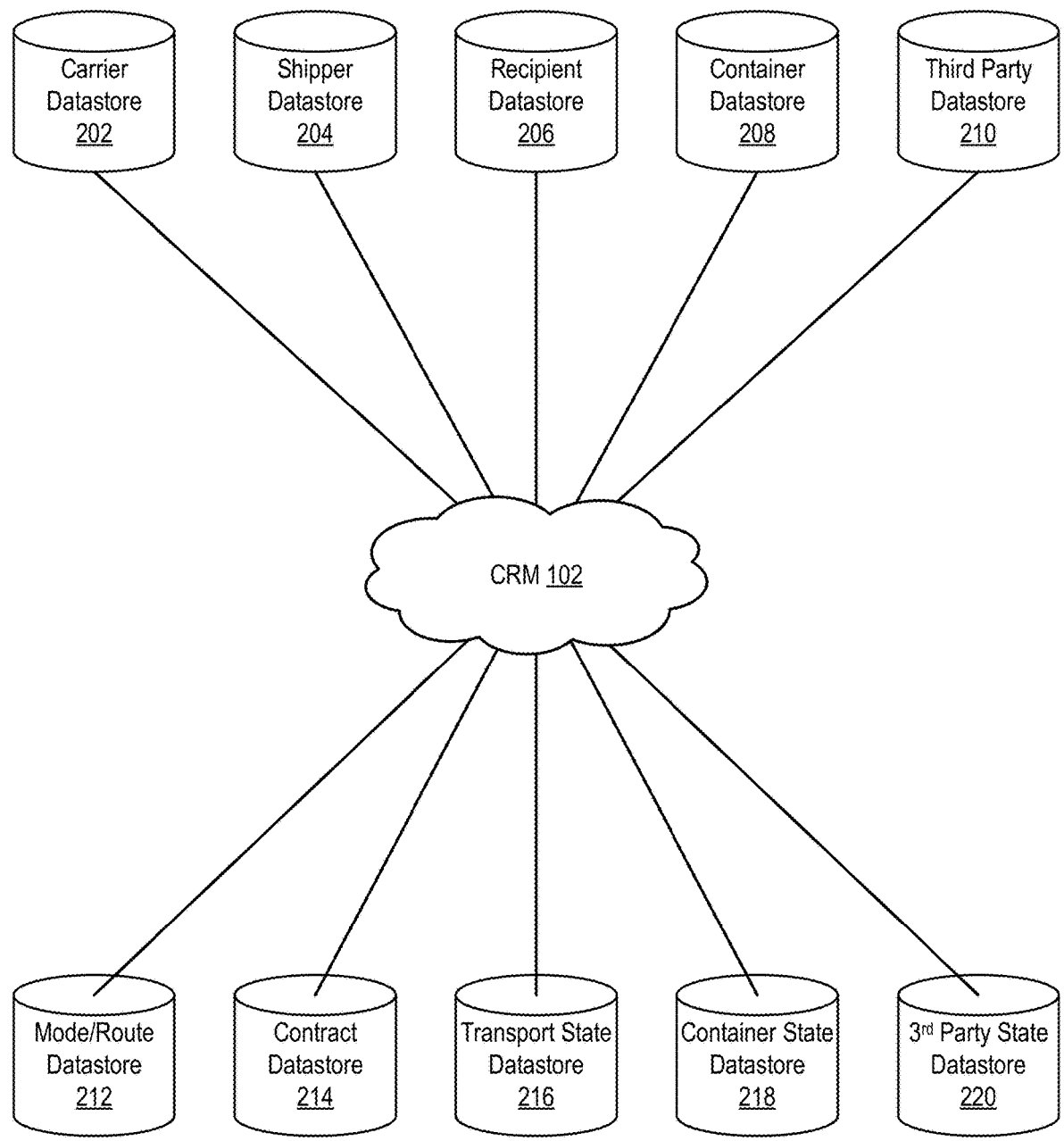

FIGS. 1 and 2 diagrams 100 and 200 of an example of a transparent end-to-end freight management system. The diagram 100 includes a computer-readable medium (CRM) 102, a carrier device 104-1 to a carrier device 104-$n$ (collectively, the carrier devices 104) coupled to the CRM 102, a cargo endpoint device 106-1 to a cargo endpoint device 106-$n$ (collectively, the cargo endpoint devices 106) coupled to the CRM 102, a teleconnected container 108-1 to a teleconnected container 108-$n$ (collectively, the teleconnected containers 108) coupled to the CRM 102, a container and transport parameter provisional allocation engine 110 coupled to the CRM 102, a transparent container and transport parameter disposition engine 112 coupled to the CRM 102, a freight forwarding oversight engine 114 coupled to the CRM 102, a container maintenance engine 116 coupled to the CRM 102, and a national customs office device 118-1 to a national customs device 118-$n$ (collectively, the national customs office devices 118) coupled to the CRM 102. The diagram 200 includes the CRM 102, a carrier datastore 202 coupled to the CRM 102, a shipper datastore 204 coupled to the CRM 102, a recipient datastore 206 coupled to the CRM 102, a container datastore 208 coupled to the CRM 102, a third party datastore 210 coupled to the CRM 102, a mode/route datastore 212 coupled to the CRM 102, a contract datastore 214 coupled to the CRM 102, a transport state datastore 216 coupled to the CRM 102, a container state datastore 218 coupled to the CRM 102, and a third party state datastore 220 coupled to the CRM 102.

The CRM 102 is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The carrier devices 104 are intended to represent end user devices used by human or artificial agents of a carrier. In common law countries, a carrier may be referred to as a common law carrier and in civil law countries, a carrier may be referred to as a public carrier, but both can be characterized as a first person or company that transports goods or people for a second person or company and is responsible for any possible loss of the goods during transport. Public airlines, railroads, bus lines, taxicab companies, phone companies, internet service providers, cruise ships, motor carriers (i.e., canal operating companies, trucking companies), and other freight companies generally operate as common carriers. Other types of carriers, such as contract carriers, private carriers, or some other first person or company that transports goods or people for a second person or company, are also anticipated. Some examples of freight ship carriers include A.P. Moller-Maersk, Mediterranean Shipping Company, CMA CGM, and Evergreen Marine Corporation. Some examples of rail carriers include Union Pacific, Canadian National Railway, and Central Japan Railway. Some example of trucking carriers include UPS Inc., FedEx Corp., and XPO Logistics.

A first subset of the carrier devices 104 can be associated with a first carrier and other subsets of the carrier devices 104 can be associated with other carriers. It should be understood, however, that multimodal transport (also known as "combined transport") with carriage performed by subcarriers (also known as "actual carriers") is the norm. Multimodal transport is the transportation of goods under a single contract, but performed with at least two different modes of transport; the carrier is liable for the entire carriage, even though it is performed by several different modes of transport (e.g., by rail, sea, road, land bridge, barge, and/or air). The carrier does not have to possess all the means of transport, and in practice usually does not. Even in an implementation in which a carrier has at least one carrier device, the subset of carrier devices 104 may or may not include end user devices used by human or artificial agents of a sub-carrier. To the extent a distinction between the carrier and sub-carriers is desired, the carrier responsible for the entire carriage may be referred to as a multimodal transport operator (MTO) in this paper. In an implementation in which a carrier has at least one carrier device, the subset of carrier devices 104 will include end user devices used by human or artificial agents of the MTO.

In a specific implementation, the carrier devices 104 include smartphones, tablets, notebook computers, laptop computers, desktop computers, IoT devices, and/or other devices that are configured to send and receive information via the CRM 102. Such devices can be specially-purposed with the installation of an application, though a general purpose browser may be adequate, depending upon the implementation, for sending relevant data to and receiving relevant data from other components illustrated in the diagram 100.

The cargo end point devices 106 are intended to represent end user devices used by human or artificial agents of a wholesaler, retailer, or other intended recipient of cargo and/or manufacturer, producer, or other source of goods to be transported as cargo (the latter is also known as a shipper). In a specific implementation, the cargo end point devices 106 include smartphones, tablets, notebook computers, laptop computers, desktop computers, IoT devices, and/or other devices that are configured to send and receive information via the CRM 102. Such devices can be specially-purposed with the installation of an application, though a general purpose browser may be adequate, depending upon the implementation, for sending relevant data to and receiving relevant data from other components illustrated in the diagram 100. International cargo source parties and international cargo destination parties may respectively be referred to as exporters (also known as shippers) and importers. One type of importer is a beneficial cargo owner (BCO), which takes control of a shipment at a destination using their own logistics assets instead of utilizing a third-party source like a freight forwarder or non-vessel operating common carriers (NVOCCs).

International freight forwarders typically handle international shipments and have additional expertise in preparing and processing customs documentation and performing activities pertaining to international shipments. More generally, a freight forwarder (also known as a forwarder), is a person or company that organizes shipments for individuals or corporations to get goods from the manufacturer or producer to a market, customer or final point of distribution. Freight forwarders contract with one or more carriers to move goods. A freight forwarder does not move the goods but acts as an expert in the logistics network. The carriers can use a variety of shipping modes, including ships, airplanes, trucks, and railroads, and often use multiple modes for a single shipment. For example, the freight forwarder may arrange to have cargo moved from a plant to an airport by truck, flown to the destination city and then moved from the airport to a customer's building by another truck. Information typically reviewed by a freight forwarder includes the commercial invoice, shipper's export declaration, bill of lading, and other documents required by the carrier or country of export, import, and/or transshipment.

International freight forwarders, NVOCCs, and customs brokers often charge for transferring documents to another transportation company at the destination. This fee is part of the ocean freight charges, being paid by the importer at the port of discharge in the International Commercial Term (incoterm) free on board (FOB), and by the exporter at the origin in the incoterms cost and freight (CFR); cost, insurance and freight (CIF); and transportation cost from factory to delivery port, custom clearance at delivery port, freight, custom clearance at discharge port, transportation from discharge port to importer factory (DDP). This fee is separate from documentation fees charged by carriers and NVOCCs as part of the freight charges on a bill of lading and is separate from other fees for document preparation or for the release of cargo. International freight forwarders, NVOCCs, customs brokers, and the like can be referred to as third party sources and may or may not also have third party source devices (not shown) that send and receive data to and from components illustrated in the diagram 100 via the CRM 102. Yard owners can also be characterized as third party sources if, for example, a yard is not owned by a shipper, and may or may not have third party source devices.

For the purposes of this paper, the carrier is generally treated as the responsible party for cargo from source to destination. Taking on this responsibility typically entails communication via a carrier device of the carrier devices 104 and two (source and destination) cargo endpoint devices of the cargo endpoint devices 106, though such communication can be accomplished without one or both endpoint devices (e.g., verbally or via a written document). It is particularly desirable to connect carriers with shippers, the connectivity of which is assumed throughout this paper.

The teleconnected containers 110 are intended to represent containers that can provide data used by other components illustrated in the diagram 100 to optimize their functionality in a manner that should become apparent from their respective descriptions. Carriers frequently use intermodal containers (also known as ISO containers because the dimensions have been defined by ISO) for the transportation of goods. Intermodal containers are 8-foot (2.4 m) wide by 8-foot (2.4 m) or 9-foot-6-inch (2.90 m) high. Since introduction, there have been moves to adopt other heights, such as 10-foot-6-inch (3.20 m). The most common lengths are 20 feet (6.1 m), 40 feet (12 m), 45 feet (14 m), 48 feet (15 m), and 53 feet (16 m), although other lengths exist. The three common sizes are: one TEU 20-by-8-foot (6.1 m×2.4 m)×8-foot-6-inch (2.59 m); two TEU 40-by-8-foot (12.2 m×2.4 m)×8-foot-6-inch (2.59 m); and highcube 40-by-8-foot (−12.2 m×2.4 m)×9-foot-6-inch (2.90 m). Handling equipment can be designed with intermodality in mind, assisting with transferring containers between rail, road and sea. These can include: container gantry cranes for transferring containers from seagoing vessels onto either trucks or rail wagons, straddle carriers, grappler lifts, reach stackers, sidelifters, forklift trucks, and flatbed trucks with special chain assemblies such as QUICKLOADZ® that can pull containers onto or off of a bed using the corner castings.

In countries where the railway loading gauge is sufficient, truck trailers are often carried by rail. Variations exist, including open-topped versions covered by a fabric curtain are used to transport larger loads. A container called a tanktainer, with a tank inside a standard container frame, carries liquids. Refrigerated containers (reefer) are used for perishables. Swap body units have the same bottom corners as intermodal containers but are not strong enough to be stacked. They have folding legs under their frame and can be moved between trucks without using a crane.

Although intermodal containers are used for multimodal transport, it should be understood not all transport that utilizes intermodal containers is actually multimodal. Also, although intermodal containers are the main type of equipment used in intermodal transport, particularly when one of the modes of transportation is by ship, other types of containers can be used. For example, container transport via air sometimes, but not always, entails the use of lightweight containers that, due to their expense, are rarely seen on roads.

Teleconnectivity can be achieved using an active or passive radio transmitter (or transceiver) with a unique identifier associated with a container to which the radio transmitter is coupled. One way for intermodal containers to be preauthorized internationally is to incorporate the radio transmitter into the container. An example of an international regulation preauthorized (IRP) teleconnected intermodal container is described in more detail with reference to FIG. 7.

The container and transport parameter provisional allocation engine 110 is intended to represent an engine that optimizes container utilization by provisionally allocating containers for use with knowledge about where the containers will be at the relevant time. Some of the larger carriers spend around $1 B per year on repositioning of containers. Provisionally allocating containers effectively can result in massive savings and ensure pricing properly represents costs and benefits of all relevant parties. The pricing model can also be made transparent (indicating costs for transportation, fees, container shortages/oversupply at particular locations, and the like). A component of an example of a system with the described advantage includes teleconnected intermodal containers. For containers that pass through customs, IRP containers are advantageous for the purpose of saving time. It may be noted a preference (or requirement) for heavy alerts can burn out batteries responsible for teleconnectivity with containers and/or increased data usage expenses, leading to increased cost estimates or quotes. Similarly, requirements associated with container history or other container-specific parameters can have an impact on estimates or quotes.

Although allocation decisions can be considered, taking into account current container allocations and transport parameters, while an agreement is being negotiated between a carrier and a shipper, for the purposes of this paper, "provisional allocation" is assumed to happen when the agreement is finalized. Provisional allocation does not necessarily require a specific container be allocated for use. For example, if multiple applicable containers are predicted to be available at a location, provisional allocation can use a wildcard in place of a container identifier and any available container meeting the requirements of the agreement can be explicitly allocated at the relevant time. This can reduce problems that crop up due to delays, errors, or other factors that are beyond the control of the container and transport parameter provisional allocation engine 110 at the time of the provisional allocation. Alternatively, container identifiers can be explicit in the provisional allocation but updated at the time of actual allocation.

The transparent container and transport parameter disposition engine 112 is intended to represent an engine that facilitates the use of containers in a manner that meets both internal (carrier) requirements (and preferences, if applicable) and external (shipper and/or recipient) requirements (and preferences, if applicable). Depending upon selections related to quality of service, a shipper can include requirements for real-time tracking, environmental conditions (e.g., shock, tilt, humidity, smell) in and/or around a container, container positioning, door open alerts, motion detection within a container, geofencing alerts, cargo staging, container history, time and costs associated with transportation modes, paths, and ports of entry, to name several. If applicable, a recipient may also provide container and transport parameters, though this is often passed through the shipper without explicit communication between the carrier and recipient. Because carriers look after these preferences and requirements but do not have possession of a container at all times, such as when loaded on a partner container ship, carriers will generally have a desire to obtain such information, as well.

To the extent the transparent container and transport parameter disposition engine 112 makes use of real-world stimuli, the engine is assumed to include any applicable sensors, such as network interfaces and/or telecommunications technology that can receive messages from the carrier devices 104, messages from the cargo endpoint devices 106, messages from the teleconnected containers 108, and messages from third parties. In some cases, telecommunications equipment can also be located on transports, such as container ships, to facilitate short-range communication between the teleconnected containers 108 and the local telecommunications equipment (thereby conserving battery power due to the lower power requirements for short-range transmission). For the purposes of this paper, telecommunications technology incorporated into the teleconnected containers is assumed to be part of the teleconnected containers themselves and, therefore, not part of the transparent container and transport parameter disposition engine 112, though the distinction is not critical for the purpose of understanding the technology described herein. Data obtained by the transparent container and transport parameter disposition engine 112 may be useful to the container and transport parameter provisional allocation engine 110. However, it is assumed the container and transport parameter provisional allocation engine 110 obtains data obtained from the interfaces and/or sensors of the transparent container and transport parameter disposition engine 112 through the relevant datastores illustrated in diagram 200 via applicable interfaces.

The freight forwarding oversight engine 114 is intended to represent an engine that uses data from the teleconnected containers 108 (or uses data obtained from other interfaces and/or sensors) to establish timing associated with cargo handoff between parties. It is known that as many as 60% of carrier staff can be involved in resolving freight forwarding disputes. From a shipper's perspective, freight forwarding can be frustrating because they can lose all visibility for hours but still have to time a delivery properly. From the recipient's perspective, delivery is often handled by temps who are paid by the hour so if a shipment is late, there can be some rather high attendant costs. To gain some insight, it is not uncommon to call every few hours for a delivery update, which is resource-intensive. It is also difficult to know whether a bad actor is exaggerating wait times and some estimates on the expense of such fraud is as high as 10% of total freight forwarding costs. From a carrier's perspective, some containers are unloaded and used for other purposes because time allows, which reduces the lifetime of the container; carriers would typically prefer to compute free time rather than relying upon third parties to have some insight into container utilization. Indeed, carriers may be able to charge $100 or so per day of container use time. Utilizing data from the teleconnected containers 108 can ameliorate these problems and also determine when a container is idle (e.g., if it is being used for storage), even in instances where carriers don't own their own yard. The freight forwarding oversight engine 114 can also make use of data obtained from sensors that are not incorporated into the teleconnected containers 108, such as bar code readers, RFID receivers, or the like. To the extent such devices are not under the control of the carrier, such devices are considered part of the freight forwarding oversight engine 114, though the data is assumed to be accessible to the transparent container and transport parameter disposition engine 112. To the extent such devices are under the control of the carrier, such devices are considered part of the transparent container and transport parameter disposition engine 112. In either case, the data obtained from such devices is stored in the third party state datastore 220.

The container maintenance engine 116 is intended to represent an engine that computers container maintenance schedules based upon container parameters. Most containers have a life of 7-10 years, which is the target life of a teleconnected container. To the extent teleconnectivity technology is installed in a specific place within a container (e.g., in the door), the teleconnectivity technology could have a target lifespan of fewer years than that of a container, with a maintenance scheduled to replace the teleconnectivity technology or the entire door into which the teleconnectivity technology has been incorporated. Maintenance can be scheduled due to aspects of a container's history, which is available in the container datastore 208, or due to aspects of a current transport state, which is available in the container state datastore 218. (After a transport is complete, applicable data from the container state datastore 218 becomes part of the container's history in the container datastore 208.) For example, if wetness is detected inside a container, a motion detector picks up movement within a container (e.g., due to an animal being trapped inside), or if a container sustains greater than an identified threshold of shock, maintenance to clean the container, check for damage, or the like, can be scheduled by the container maintenance engine 116 or an agent thereof. Advantageously, the maintenance engine 116 can also schedule maintenance depending upon a provisional allocation of a container. For example, if a container includes items with an odor (or if an odor or other applicable stimulus is detected by a sensor in the container) maintenance, in the form of washing, can be scheduled prior to loading the container with cargo that would be susceptible to degradation due to the odor (or other detected parameter), such as apparel or foodstuffs.

The national customs office devices 118 are intended to represent end user devices utilized by customs officials in multiple nations. Because the technologies described in this paper have not been deployed, customs officials currently have relatively little insight regarding containers unless they are physically present. Advantageously, customs officials will now be able to determine relevant parameters associated with a container without being physically present. As applicable for relevant regulations, data from any applicable datastore illustrated in the diagram 200 can be provided via one of the national customs office devices 118.

In an example of operation, a carrier and a shipper are connected via a carrier device of the carrier devices 104 and a cargo endpoint device of the cargo endpoint devices 106. Data associated with the carrier, such as an account identifier, contact information, and historical data related to prior transactions, is stored in the carrier datastore 202. Data associated with the shipper, such as an account identifier, contact information, and historical data related to prior transactions, is stored in the shipper datastore 204. Data associated with a recipient of the cargo being shipped, such as an account identifier, contact information, and historical data related to prior transactions, is stored in the recipient datastore 206. It may be noted that the recipient may have less associated data than the carrier and shipper, but the recipient datastore 206 will likely at least include a destination where responsibility for the cargo is handed off from the carrier (and/or shipper) to the recipient. To the extent other sources of information are available, such as through social media networks, advertisements, news articles, calendar entries, or the like, data that can be obtained through such sources can be considered part of the carrier datastore 202, the shipper datastore 204, and/or the recipient datastore 206.

The container datastore 208 includes data associated with a container, such as a container identifier, type, history (e.g., use, idle periods, shock, wetness, smell, or agent notes, to name several), current state (e.g., location, position, proximity to electronically linked containers, or latest ping, to name several), estimated lifespan, or the like. To the extent teleconnected containers are international regulation preauthorized, time-consuming issues with customs can be resolved prior to arrival at customs. To the extent the teleconnected containers are intermodal, they can be used in the same manner as other conventional intermodal containers.

The third party datastore 210 includes data about third party sources that may participate in a transaction to transport cargo on behalf of the carrier. Such third parties can include freight forwarders, NVOCCs, brokers, or the like. Third parties will add a cost and a benefit to any given transaction, generally facilitating more rapid transport of goods, providing necessary expertise in the transportation of goods, offering insurance or other financial benefits, dealing with paperwork or other administrative or legal benefits, or the like. The mode/route datastore 212 includes information about modes and routes for the transportation of cargo, which generally translates to higher relative time in transit having lower relative cost. The container and transport parameter provisional allocation engine 110 can incorporate data from the third party datastore 210 and the mode/route datastore 212 into pricing, container allocation, and mode/route selection. When the container and transport parameter provisional allocation engine 110 settles on shipper preferences regarding a shipment, the contract (and other electronic documents) are stored in the contract datastore 214.

For the purposes of this paper, it is assumed if the contract datastore 214 includes an entry, the shipper and carrier have a valid agreement and transportation of cargo can commence pursuant to the agreement. It may be noted some documents may be physical, rather than electronic, and in theory all relevant documents could be in a non-electronic format, obviating the contract datastore 214. In such an instance, the contract datastore 214 will at least include an indication there is an agreement and transportation needs (and preferences, if applicable), such as source (pickup location) and destination (drop off location), thereby acting as a flag to the container and transport parameter provisional allocation engine 110 to provisionally allocate containers to meet the transportation needs and preferences. For the purpose of this paper, such needs and preferences are considered to be part of the contract stored in the contract datastore 214.

Use of the teleconnected containers 108 permits the transparent container and transport parameter disposition engine 112 to readily determine container locations, as well as freight forwarding, customs, and other issues associated with a shipment, and establish pricing in a transparent manner. It may be noted that "determine" in this context involves some degree of prediction unless the teleconnected containers 108 (or at least one of them that is on a same transport, or an agent of the transport itself) are in continuous communication with the transparent container and transport parameter disposition engine 112. In a specific implementation, such communication is frequent (e.g., every 15 minutes, though the ping rate is likely to be lower if a container is expected to remain in a transport for multiple hours in order to reduce power consumption by telecommunications devices, in which case the teleconnected containers 108 may maintain a log that is transmitted in batch at a predetermined time or when a stimuli, such as passing a geofence, is detected) but not continuous.

From the time cargo is to change hands from the shipper to the carrier, the transparent container and transport parameter disposition engine 112 stores data about the transportation of cargo in the transport state datastore 216 and the data about the containers, including any detectable events associated with the parameters, if applicable, in the container state datastore 218. Both the carrier and the shipper can have access to the transport state datastore 216 and the container state datastore 218, but the available data need not be the same. For example, a carrier may have access to a container lifespan parameter, while the shipper may not. Such data is accessible via the carrier device (or another carrier device associated with the carrier) and/or the cargo endpoint device (or another cargo endpoint device associated with the shipper). Instead or in addition, the data can be made accessible to the intended recipient of the cargo (via a cargo endpoint device of the cargo endpoint devices 106), customs officials (via a national customs office device of the national customs office devices 118), freight forwarders (via a third party source device), or other applicable parties.

When cargo is changes hands, the freight forwarding oversight engine 114 stores in the third party state datastore relevant timestamps and locations, such as when the cargo arrives at a destination or interim destination, how long the cargo is at rest (which may be accomplished with two or more timestamps), when the container door is opened, when the cargo is closed after offloading, parties that are determined to be proximate to the container (e.g., using a short-range radio technology, such as Wi-Fi, RFID, or a barcode or QR code scanner for willing participants), how long the container is at rest after offloading, and where and when the container is taken after offloading. The container maintenance engine 116 determines whether the container should undergo maintenance and, if maintenance is deemed unnecessary or after the maintenance is indicated to be complete, the container is indicated to be available for allocation once again (which should not be assumed to preclude allocation using an estimate regarding when in the future a container should become available).

Figure 3:
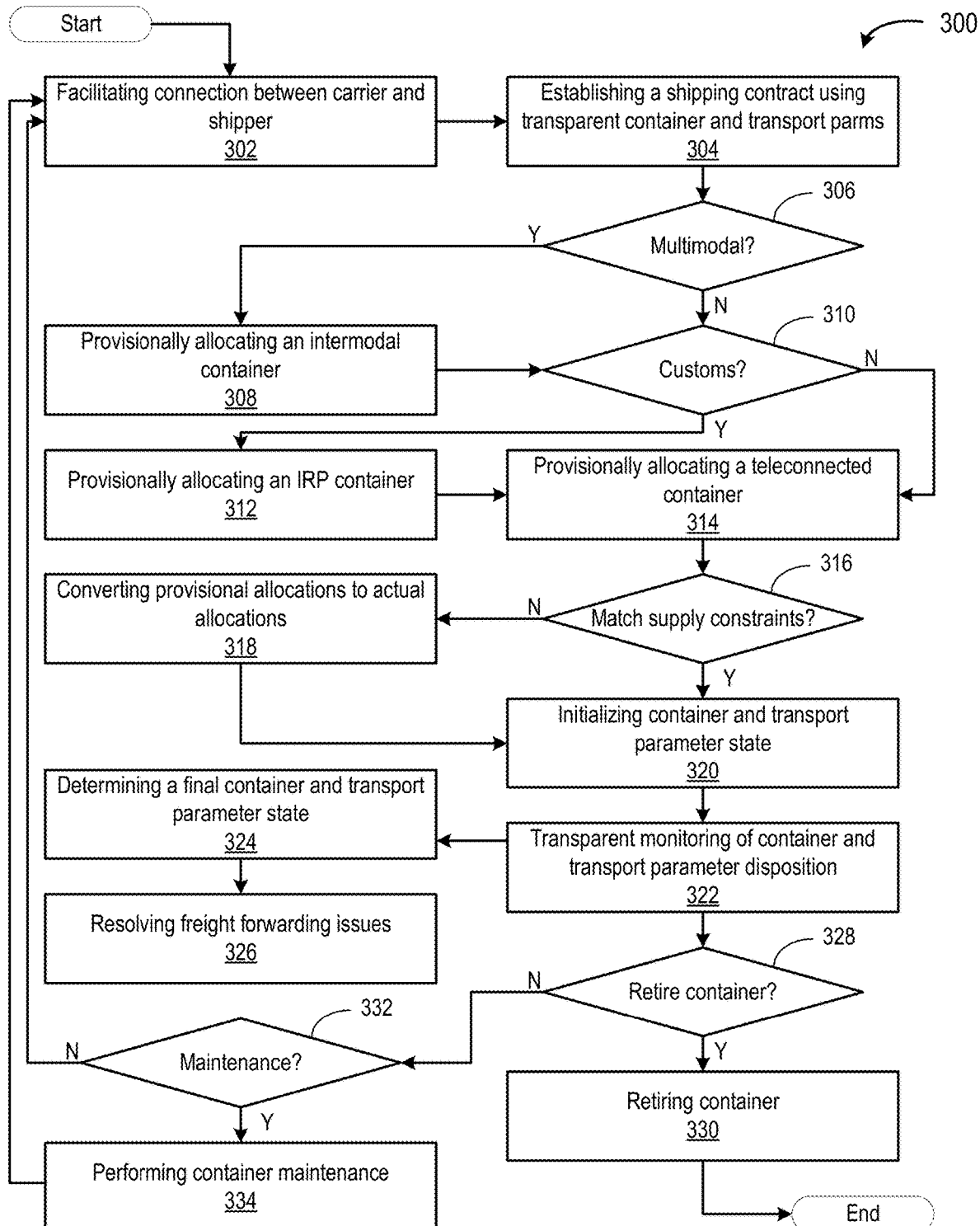
FIG. 3 is a flowchart of an example of a method of transparent end-to-end freight management.

FIG. 3 is a flowchart 300 of an example of a method of transparent end-to-end freight management. The flowchart 300 starts at block 302 with facilitating a connection between a carrier and a shipper. In a specific implementation, the connection is established over a CRM, such as the CRM 102 described with reference to FIG. 1, using applicable computing devices, such as one of the carrier devices 104 described with reference to FIG. 1 for the carrier and one of the cargo endpoint devices 106 described with reference to FIG. 1 for the shipper. Data associated with the carrier, the shipper, and, if applicable, a recipient, are stored in a datastore, such as one or more of the carrier datastore 202, the shipper datastore 204, and the recipient datastore 206, as described with reference to FIG. 2. It is not a requirement that the shipper and the carrier be paired (e.g., they could contact one another directly via a communication channel outside the control of the platform through which transportation disposition is monitored) but at some point at least a shipping contract parameter is brought onto the platform.

The flowchart 300 continues to block 304 with establishing a contract between the carrier and the shipper using transparent container and transport parameters. In this context, transparent means the location and disposition of applicable containers, as well as parameters of a route, including freight forwarding, customs requirements, multimodal requirements, transit times, expected wait times, and container disposition requirements, are known. Advantageously, this transparency improves both timing and pricing accuracy, as well as container utilization (which can be incorporated into timing a pricing models, either as part of a given transaction or as an estimate of carrier overhead). Access to a container datastore, such as the container datastore 208 described with reference to FIG. 2, enables a container and transport parameter provisional allocation engine, such as the container and transport parameter provisional allocation engine 110 described with reference to FIG. 1, to provisionally allocate containers (and, when negotiating the contract, to understand container availability). Access to a third party datastore, such as the third party datastore 210 described with reference to FIG. 2, enables the container and transport parameter provisional allocation engine to contact relevant parties, such as freight forwarders, regarding upcoming responsibilities in association with the shipment (or, if applicable, establish contracts with relevant parties before or after the contract between the carrier and shipper is finalized). Access to a mode/route datastore, such as the mode/route datastore 212 described with reference to FIG. 2, enables the container and transport parameter provisional allocation engine to better understand timing and costs associated with known transportation channels. When the contract is established between the carrier and the shipper, it is stored by the transport parameter provisional allocation engine in a contract datastore, such as the contract datastore 214, including applicable container and transport parameters.

The flowchart 300 continues to decision point 306 where it is determined whether the contracted route calls for multimodal freight handling. If it is determined multimodal freight handling is called for (306-Y), then the flowchart 300 continues to block 308 where an intermodal container is provisionally allocated and then to decision point 310. If, on the other hand, it is determined modal freight handling is not called for (306-N), then the flowchart 300 continues to directly to decision point 310 where it is determined whether the contracted route requires passing through customs. It should be noted that even if intermodal freight handling is not called for, it may still be desirable to provisionally allocate an intermodal container because that is what is available or because a less-than-truckload (LTL) cargo contract is combined with other LTL cargoes in a single intermodal container. (An LTL cargo could even be loaded into an intermodal container that is not full.)

If it is determined the route passes through customs (310-Y), then the flowchart 300 continues to block 312 where an international regulations preauthorized (IRP) container is provisionally allocated and then to block 314. If, on the other hand, it is determined the route does not pass through customs (310-N), then the flowchart 300 continues directly to block 314 where teleconnected containers are provisionally allocated in accordance with container parameter requirements and/or preferences. It should be noted it is not a requirement that an IRP container be intermodal, but in a specific implementation, and as illustrated in the example of FIG. 7, IRP intermodal containers are anticipated. Accordingly, if an intermodal container is provisionally allocated (see block 308 and note even in block 308 is skipped an intermodal container may still be provisionally allocated) and an IRP container is provisionally allocated, it is assumed to be the same container (i.e., an IRP intermodal container). Moreover, if block 312 is skipped, it may still be desirable to provisionally allocate not only an intermodal container, but an IRP intermodal container. For the purposes of this example, it is assumed a container used for at least a first portion of the route is teleconnected, though a second portion of a route may or may not be made with a teleconnected container (e.g., an air freight container or LTL container may lack teleconnectivity).

An applicable engine for carrying out the decision points/blocks 306-314 is the container and transport parameter provisional allocation engine 110 described with reference to FIG. 1. Any inputs necessary to make the determination can be provided by a human or artificial agent thereof.

The flowchart 300 continues to decision point 316 where it is determined whether provisional allocations match supply constraints. If it is determined provisional applications do not match supply constraints (316-N), then the flowchart 300 continues to block 318 with converting provisional allocations to actual allocations, and then to block 320. The conversion can be accomplished by updating provisional allocations of containers with containers that are available for allocation (e.g., by updating container entries in a container datastore to associate a container with the relevant contract). Similar updates can occur throughout the life of freight handling, such as if a route is changed, an alternative freight forwarder is used, delays result in modifications to a planned handoff, or the like. Converting provisional allocations to actual allocations may also require repositioning of containers (e.g., moving containers from a port with a surplus to a port near a pick up location). Ideally, empty containers are not repositioned, so, if possible, provisional allocations across multiple shipping contracts should be considered prior to repositioning to facilitate actual allocations. Indeed, special deals can be offered to shippers who make contracts that utilize containers that would otherwise be repositioned in an empty state.

If, on the other hand, it is determined provisional applications match supply constraints (316-Y), then the flowchart 300 continues directly to block 320 where transparent container and transport parameter disposition is initialized with an initial container and transport parameter state.

In a specific implementation, the initial transport parameter state is a "pre-pickup state" that includes an identified set of allocated containers, an identified transport (e.g., truck) for taking the allocated set of containers to a pick up location (or reloading the allocated containers if they are unloaded at the pick up location and then reloaded), and a contracted handoff window or time. If desired, the pre-pickup state can be broken down into sub-states, such as "provisionally allocated," "allocated," "containers loaded onto transport," and "on route to pick up location." It may be noted that a shipping contract may call for multiple transports and/or pick up windows or times, and each transport can have a different state. At the time of pick up, the transport parameter state can change upon arrival within the pick up window to "arrived," then to "loading," and finally to "departing." States of idleness may also be noted, if applicable, as can a countdown to a predicted state change (e.g., the time expected to go from "allocated" to "containers on transport"). It should be understood these state names are for human readability and the actual states can have far more parameters, resulting in billions of sub states that are grouped for the benefit of human agents.

The initial container state would be the state of containers prior to or at the time cargo is handed off from a shipper to the carrier (or an agent thereof). Depending upon the implementation, container state can be recorded in a container datastore, such as the container datastore 208 described with reference to FIG. 2. Over time, a container state datastore, such as the container state datastore 218 described with reference to FIG. 2, can accumulate container state data that has not yet been transmitted to a container and transport state parameters disposition engine, such as the container and transport state disposition engine 112 described with reference to FIG. 2. For example, containers can log events, which are recorded in the container state datastore, and transmit the log at a later date (e.g., as a batch), with the container state datastore therefore potentially including data at each container that is not yet found in the container datastore. Conversely, the container datastore may store historical data about a container that it is not deemed necessary for inclusion in the container state datastore. In any case, the initial state of each allocated container is at least likely to be known, in which case the container state datastore may not have any data that is not also found in the container datastore. Once the containers are actually deployed, however, it is unlikely the containers will remain in continuous communication with the container and transport state parameters disposition engine, making it likely the container state datastore will accumulate data not found in the container datastore.

The flowchart 300 continues to block 322 with transparent container and transport parameter disposition monitoring and to block 324 with determining a final container and transport parameter state. An applicable engine for carrying out the decision points/blocks 316-324 is the transparent container and transport parameter disposition engine 110 described with reference to FIG. 1. Any inputs necessary to make the determination can be provided by a human or artificial agent thereof. Transparency means the carrier (and, if applicable, shipper, recipient, or third party) can see an accurate representation of transport parameters in near real time (with the precise time slice being determined by the rate of telecommunication with the teleconnected containers, knowledge about routes, and the like). Such transparency enables the carrier to estimate container availability, oversee quality controls, obtain timestamps throughout the route (and particularly at freight forwarding and geofencing events), and otherwise act on behalf of the carrier's and shipper's requirements and preferences.

The flowchart 300 continues to block 326 with resolving freight forwarding issues. A freight forwarding oversight engine, such as the freight forwarding oversight engine 114 described with reference to FIG. 1, can use a transport state datastore, such as the transport state datastore 216 described with reference to FIG. 2, and the container state datastore, such as the container state datastore 218 described with reference to FIG. 2, for the purpose of resolving any outstanding issues related to freight forwarding timing, accrued late fees, or the like. If applicable, other datastores, such as those illustrated in diagram 200, can also be accessed. While freight forwarding issues are perhaps the most prevalent, other types of oversight engines (not shown) can also be used for the oversight of any applicable third party using the datastores illustrated in diagram 200.

The flowchart 300 continues to decision point 328 where it is determined whether a container is to be retired. If it is determined a container is to be retired (328-Y), then the flowchart continues to block 330 with retiring a container and the flowchart ends. At this point, the container is not available for allocation. Knowledge that a container will be retired is available prior to the actual retirement of the container, so it is desirable to use containers that will retire such that they are retired at a port where surplus containers are relatively common phenomena. It may be noted this decision point (and decision point 332, described later) can be considered to operate in parallel for applicable containers.

If, on the other hand, it is determined a container is not to be retired (328-N), then the flowchart 300 continues to decision point 332 where it is determined whether maintenance is to be scheduled. If it is determined maintenance is not to be scheduled (332-N), then the flowchart 300 returns to block 302 and continues as described previously. If on the other hand, it is determined maintenance is to be scheduled (332-Y), then the flowchart 300 continues to block 334 with performing maintenance on the container and then returns to block 302 and continues as described previously. At this point, the container is available for allocation, though if the maintenance was expected (or if the maintenance is fast enough that schedules can be met post-maintenance), the container could have been provisionally allocated before the maintenance was performed and allocated thereafter.

Figure 4:
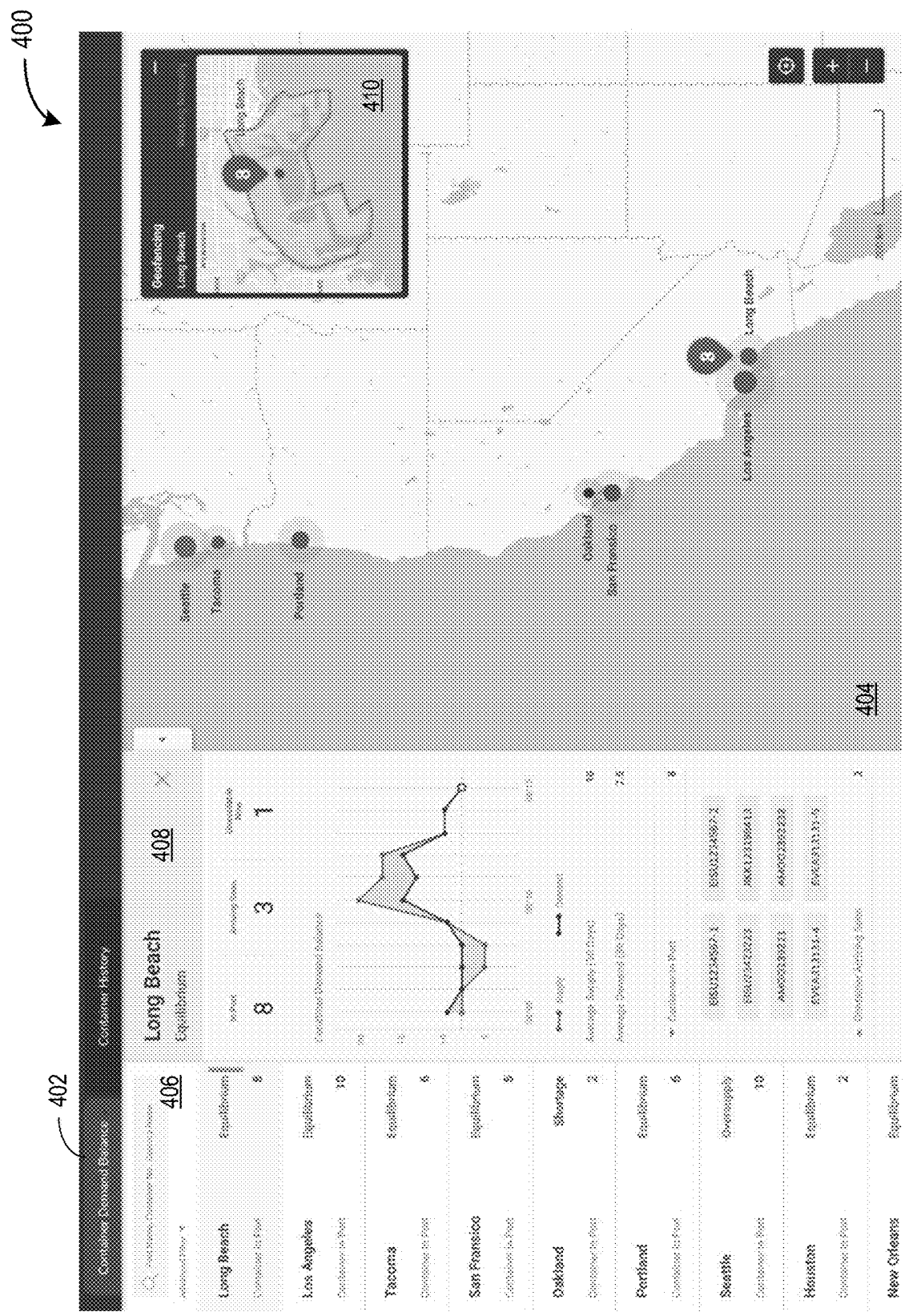
FIGS. 4 and 5 are screenshots of an example of transparent end-to-end freight management user interfaces.
Figure 5:
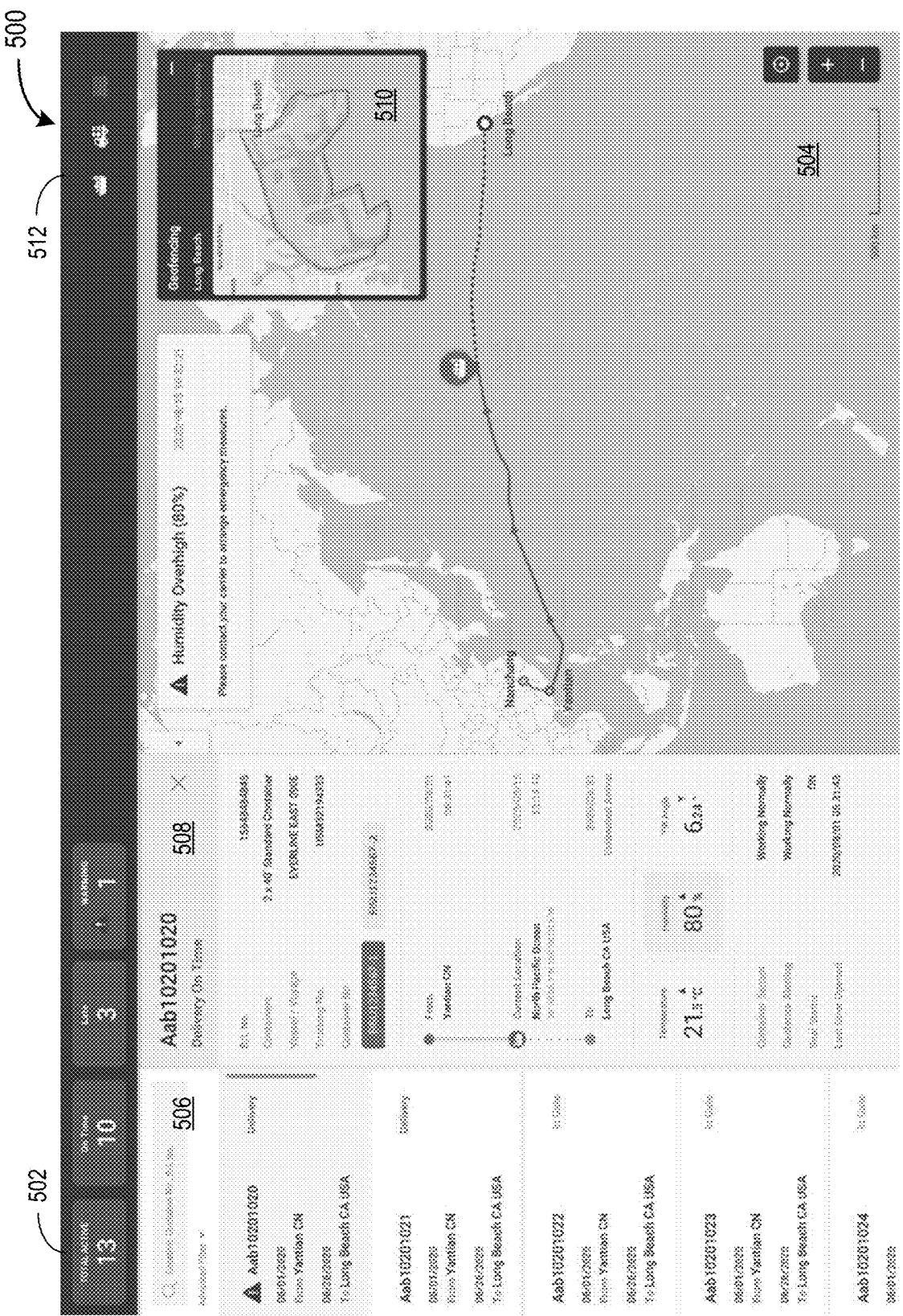

FIGS. 4 and 5 are screenshots of an example of transparent end-to-end freight management user interfaces. FIG. 4 is a screenshot 400 of an example of a container demand balance user interface. The screenshot 400 includes a container demand balance tab 402, a regional port map 404, a port panel 406, a selected port panel 408, and a geofencing window 410. The container demand balance tab 402 is intended to be selected by (typically) a human agent of a carrier for the purpose of gaining insight into the locations of containers in ports. In the example of FIG. 4, the data is current (with some historical data) but container locations as of any time (past, present, or future) can be illustrated in such an interface. For future container locations, provisional allocations, with modifications for expected container retirement, allow a projection of container locations at a future date. Such predictive insights allow for assessments of the value of empty containers in a first location, which can impact deals with applicable shippers in which discounts are offered for shipping from a location with a projected oversupply of containers or to a location with a shortage of containers.

The regional port map 404 is intended to offer a geographic perspective of container demand for a given region. Although it is not depicted, a global port map can also be displayed, with a regional drill down into any applicable region size. The ports in the regional port map 404 are represented by a port designation (in this example, city name) and a graphic (in this example, a circle). The graphic has a size that depends upon container supply (e.g., Seattle and Los Angeles both have the greatest container supply, 10 in this example, so they have the largest graphic). The graphic is color-coded to match a container supply tag, as discussed in the following paragraph.

The port panel 406 is intended to offer a perspective of container demand at multiple ports. The port panel 406 lists ports in a manner that is adjustable in accordance with (typically) carrier human agent preferences. As shown, the top of the list is ports that are illustrated in the regional port map 404. In the screenshot 400, the ports are listed by name of city, though another applicable designation could be used. In the screenshot 400, ports other than those depicted in the regional port map 404 (e.g., Houston and New Orleans in this example) are listed after the ports illustrated in the regional port map 404. A first port (e.g., Long Beach in this example) is shaded to indicate the first port is a "selected port." Selecting a second port on the list would cause the second port to be shaded to indicate the second port is the "selected port." Although the images are not color-coded, in a specific implementation, the container supply tag "Shortage" (the tag associated with Oakland in the screenshot 400) is depicted in red text; the container supply tag "Equilibrium" (the tag associated with Long Beach, Los Angeles, Tacoma, San Francisco, Portland, Houston, and New Orleans in the screenshot 400) is depicted in green text; and the container supply tag "Oversupply" (the tag associated with Seattle in the screenshot 400) is depicted in blue text. Next to the name of each port in the port panel is also a number that represents how many containers are available at the port, which is also, in a specific implementation, depicted in the same color of text as the container supply tag of the port.

The selected port panel 408 includes data associated with the selected port (e.g., Long Beach in this example). Three numbers represent container supply at the port (e.g., 8 in this example), containers arriving soon to the port (e.g., 3 in this example), and containers unavailable now (e.g., 1 in this example). The value of "soon" for the purpose of indicating whether a container will arrive soon is implementation-, configuration-, and/or preference-specific. For example, a carrier human agent may want to know container supply in three days and adjust "soon" to mean a predicted container supply in three days. Containers can be unavailable because they have not been emptied or are allocated (or provisionally allocated) for use.

The selected port panel 408 also provides a graph of historical container demand balance at the selected port that includes a "Supply" curve and a "Demand" curve on an x-axis representative of date and a y-axis representative of containers in port. Although the screenshot 400 is not in color, in a specific implementation a "Supply" curve is color-coded using the same color text as the "Oversupply" container supply tag and the "Demand" curve is color-coded using the same color text as the "Shortage" container supply tag; and the area between the curves is color coded with a fill color that matches the higher curve. For example, in the screenshot 400, the "Supply" curve is greater than the "Demand" curve from 08/05 to 08/06 and from 08/06 to 08/09, so the fill between the curves could be shaded red, while the "Demand" curve is greater than the "Supply" curve from 08/09 to 08/13 so the fill between the curves could be shaded blue. Where the curves intersect, container supply can be characterized as at equilibrium.

In the selected port panel 408, below the graph is a numerical representation of average supply over a 30 day period (e.g., 10 in this example) and average demand over a 30 day period (e.g., 7.5 in this example). Whether and to what degree the timespan can be adjusted is implementation-, configuration-, and/or preference-specific.

In the selected port panel 408, a containers are listed by identifier in a "Containers in Port" section of the panel. This allows a human agent to drill down into a container to access parameters associated with the container. A similar section of the panel includes "Containers Arriving Soon," which is not illustrated but would have similar details, plus (likely) an estimated time when the container will arrive and/or become available.

The geofencing window 410 is intended to illustrate the geographic fence boundaries of the selected port. In the screenshot 400, the geofence is illustrated as a line surrounding an area that includes the port, as well as an indicator of the number of containers currently in the port. The geofencing boundary, area within the geofencing boundary, and the container supply indicator can all be color-coded to match the applicable container supply tag (e.g., green for "Equilibrium" in this example).

FIG. 5 is a screenshot 500 of an example of a shipment disposition monitoring user interface. The screenshot 500 includes a title bar shipment summary section 502, a shipment route map 504, a shipment panel 506, a selected shipment panel 508, a geofencing window 510, a title bar shipment modality section 512, and an alert window 514. The title bar shipment summary section 502 is intended to be customized on a per-shipper basis for the purpose of providing a human agent of a shipper insight into the disposition of their own shipments. If accessed by a carrier or some other party with global access, the shipment summary could include all shipments which could be sorted on a per-shipper basis. In the example of FIG. 5, the data is current (with some historical data) but shipment dispositions as of any time (past, present, or future) can be illustrated in such an interface. For current or future shipments, provisional allocations, with modifications for special deals offered by a carrier for use of alternative ports or routes (e.g., based upon projected supply of containers), allow a projection of cost and time if routes are adjusted to take advantage of such deals. Adjustments to routes can also be made in the case of delays, accidents, or for some other reason that makes a shipper desire to change routes after shipment has commenced.

The shipment route map 504 is intended to offer a geographic perspective of a disposition of a shipment along a route. Although it is not depicted, a regional drill down into a localized leg of a route is possible by clicking on the leg of the route. For example, in the screenshot 500, a human agent could mouse over a leg of the route (e.g., from Nanchang to Yantian) and click to localize that leg of the route for display on the shipment route map 504. Nodes along the route in the shipment route map 504 are for relevant ports and other locations where cargo is handed off from one party to another (e.g., a carrier to a partner carrier or freight forwarder) and/or there is a change in mode (e.g., from truck to ship). In this example, the points are represented by a handoff location designation (in this example, city name) and a graphic (in this example, a circle within a circle). The graphic has a size that depends upon whether the handoff location is historical (e.g., Nanchang and Yantian are past handoff locations, so they have the smaller graphic, while Long Beach is a future handoff location, so it has a larger graphic). Although the screenshot 500 is not in color, the graphic and route are color-coded for transport modality (e.g., the leg from Yantian to Nanchang can be in one color, such as yellow, to indicate a trucking modality, while the leg from Nanchang to Long beach can be in a second color, such as blue, to indicate a shipping modality). Also, the curve representing the route is represented as a solid line for a portion of the route that has been covered and a dashed line for a projected portion of the route. Obviously, the route depicted in the shipment route map 504 is only an example; the route could include more legs, such as a land bridge across the U.S. and a further leg to London, and multiple nodes that are not necessarily cities, and even removal of cargo from a container for placement into smaller containers suitable for LTL and tracking of the smaller containers (though not necessarily with container state data unless the smaller containers have the applicable teleconnectivity).

The shipment panel 506 is intended to offer a perspective of shipment disposition for shipments associated with a shipper (or, if applicable, multiple shippers). The shipment panel 506 lists shipments in a manner that is adjustable in accordance with (typically) shipper human agent preferences. A first shipment (e.g., Aab10201020 in this example) is shaded to indicate the first shipment is a "selected shipment." Selecting a second shipment on the list would cause the second shipment to be shaded to indicate the second shipment is the "selected shipment." As shown, the list of shipments are designated by a shipment identifier and include a date of departure from the last node (starting point of a leg), the designation of the last node (e.g., Yantian, CN in the screenshot 500), an estimated date of arrival at the next node (e.g., endpoint of a leg), and a designation of the next node (e.g., Long Beach, CA, USA in the screenshot 500). Each shipment can also have a status tag, such as "Delivery" or "In Gate," which can be color coded to indicate timeliness. A more precise time can replace the date for each shipment, depending upon implementation-, configuration-, and/or preference-specific factors.

The selected shipment panel 508 displays data associated with the selected shipment (e.g., Aab10201020 in this example). A "Delivery On Time" tag indicates the delivery is on time (and could be color coded in green), but the tag could be changed to "In Gate," "Delayed," or some other tag that is representative of the current state of delivery. The selected shipment panel 508 includes B/L No. (e.g., 15648484845 in this example), Containers (e.g., 2×40' Standard Container in this example), Vessel/Voyage (e.g., EVERLINE EAST 090E in this example), Tracking No. (e.g., USM32194333 in this example), and Container No. (e.g., EISU1234567-1 and EISU1234567-2 in this example). Clicking on a container can drill down into container history, which is displayed below the other information. A container can be autoselected if there is an alert and/or the container with an alert can be highlighted to encourage selection of that container for drilldown by an agent of the carrier or shipper. A shipper may or may also have the ability to ping a container, causing the container to transmit data in a container state datastore, though data usage costs may apply. The selected shipment panel also includes a graphic rather like that depicted in the shipment route map 504, but including some additional information (e.g., a date and timestamp of the last node, a location including longitude and latitude and a date and timestamp of a current location, and a date of the next node). In the screenshot 500, the additional information about the next node includes the text "Estimated Arrival," but this could be replaced with a time or a range of times.

A container state portion of the selected shipment panel 508 is derived from a last transmission of container state from one or more of the containers of the selected shipment. The frequency of transmissions is implementation-, configuration-, and/or preference-specific, but data usage costs may apply. In a specific implementation, container state transmissions are triggered when a sensor provides data to a sensor data analysis engine that determines the data is indicative of a stimulus having a magnitude that exceeds an acceptable stimulus threshold. In the present example, a temperature of 21.5 degrees Celsius and a tilt angle of 6.24 degrees may not trigger a container state transmission (and the temperature and tilt angle can be indicative of a last-detected temperature and tilt angle, which has not been updated in real time) but a humidity of 80%, because it, for the purposes of this example, exceeds an acceptable humidity threshold, may trigger a transmission of container state (or the container state could be logged and the data sent in accordance with a transmission schedule that does not transmit when an alert is generated). Although the screenshot 500 is not in color, in a specific implementation, the humidity value would be color-coded in red to indicate it exceeds an acceptable humidity threshold.

The container state portion of the selected shipment panel also includes a disposition for container sensors (e.g., "Working Normally" in this example), container alerting (e.g., "Working Normally" in this example), seal status ("ON" in this example), and a last door opened timestamp (e.g., 2020/08/01 05.41.43 in this example). Additional or alternative information is implementation-, configuration-, and/or preference-specific, but could include a container transmission schedule, a drilldown into different sensors, relative container position, motion detection, lock status, shock values, odor/particulate detection sensors and status, video feeds (potentially triggered with motion detection), mesh status (if containers are capable of forming a mesh network), geofencing log (e.g., updated at a port geofence and when crossing state lines), a hibernation timestamp (e.g., for when the container is indoors or in another location where transmission of container state becomes problematic), or the like.

The geofencing window 510 is intended to illustrate the geographic fence boundaries of a next node. In the screenshot 500, the geofence is illustrated as a line surrounding an area that includes a port. Although not shown in the screenshot 500, in a specific implementation, when a container is inside the geofenced area, the specific location of the container is indicated with a graphic within the geofencing window 510. The accuracy of the location is implementation-specific but known or convenient techniques can accurately estimate container location within sufficient precision to predict a container-specific location in which the container can be found (e.g., lot number). Moreover, if stacked and containers are capable of forming a mesh network, height within a stack can be readily ascertained. It may be noted that a shipper need not be associated with all nearby containers to take advantage of some degree of mesh networking. For example, a carrier (or higher level platform) may have access to more containers than an individual shipper. Container proximity can also be useful for the purpose of freight forwarding. For example, a freight forwarder may wish to wait until containers of a shipment are relatively close to one another before pickup. In this context, proximity means sufficiently close to one another that the containers can be identified as ready to be picked up together.

The title bar shipment modality section 512 indicates the modalities associated with a shipment. In the screenshot 500, an image of a ship and an image of a truck are highlighted and an image of a train is dimmed, indicating a multimodal transport utilizing both shipping and trucking modalities. If desired, a current modality for a shipment could be further highlighted in some fashion, though this is not done in the example of FIG. 5. The interface also omits modalities that might appear to be clutter to certain customers. For example, an air freight modality may not be frequently utilized by certain carriers, making an airplane image unnecessary clutter (though it could certainly be added for carriers who are interested in including an air freight modality). The image also assumes the use of standard intermodal containers, rather than smaller containers (such as those used for LTL cargo that are not bundled into a larger container) or even exotic containers (such as submarine or extraplanetary cargo containers), though modalities associated with such containers could easily be added to the title bar shipment modality section 512.

The alert window 514 is intended to draw attention to an alert. Alerts can fall under multiple levels of severity but for the purpose of example, it as assumed they include warnings and notifications. In the alert window 514, a "Humidity Overhigh" warning is indicated, along with the humidity "(80%)." The warning includes a date and timestamp and a message (e.g., "Please contact your carrier to arrange emergency measures" in this example). In this example, the warning corresponds to the high humidity detection that is also depicted in the selected shipment panel 508. An example of a notification is "Geofencing Entry Detected," which would trigger when a container crosses a geofence and would include a date and timestamp and a message (e.g., "Vessel arrived at the point of discharge. Waiting for discharging.").

Figure 6:
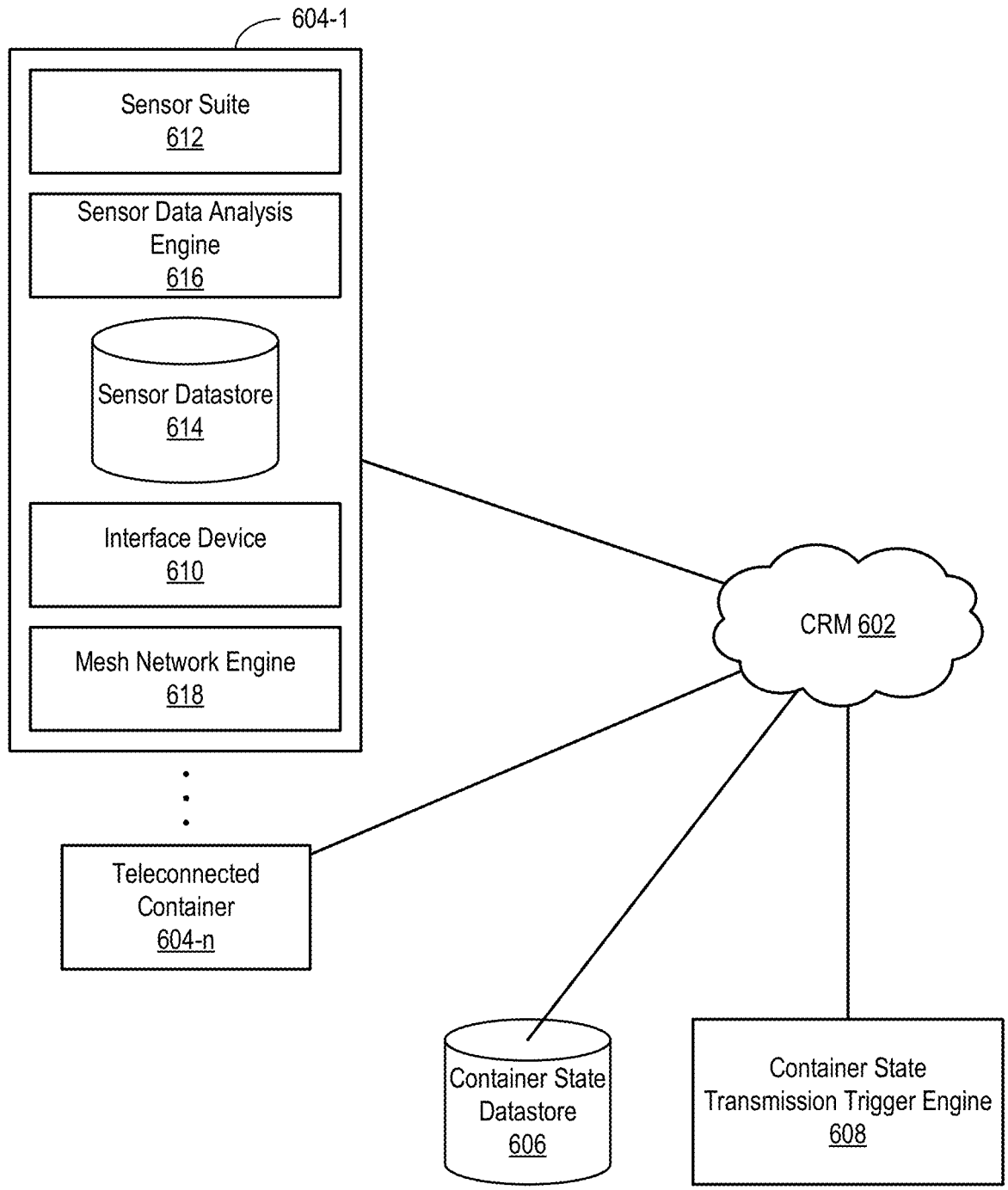
FIG. 6 is a diagram of an example of teleconnected containers.

FIG. 6 is a diagram 600 of an example of teleconnected containers. The diagram 600 includes a CRM 602, a teleconnected container 604-1 to a teleconnected container 604-n (collectively, the teleconnected containers 604), a container state datastore 606, and a container state transmission trigger engine 608. Although the diagram 600 is intended to represent one example of teleconnected containers, if incorporated into the system described with reference to FIGS. 1 and 2, the CRM 602 can be considered part of the CRM 102, the teleconnected containers 604 can be considered part of teleconnected containers 108, the container state datastore 606 can be considered part of the container state datastore 218, and the container state transmission trigger engine 608 can be considered part of the transparent container and transport parameter disposition engine 108.

The CRM 602 is broadly intended to represent a computer system or network of computer systems. In a specific implementation, the CRM 602 includes telecommunications technology located within the teleconnected containers 604 (i.e., transmitters or transceivers with interfaces to the container state datastore 606 and a LAN, satellite network, cellular network, WAN, or other communication network through which container state data from the container state datastore 606 can be provided to an end-to-end freight management system such as is described with reference to FIGS. 1 and 2).

In a specific implementation, the teleconnected containers 604 are purposefully built or configured Internet of Things (IoT) devices, or collections of IoT devices. In being purposely built IoT devices, the teleconnected containers 604 are built to have specific operational parameters. For example, a teleconnected container of the teleconnected containers 604 may include a thermometer configured to provide signals from a temperature sensor. In being purposely configured IoT devices, the teleconnected containers 604 can be configured to operate according to specific operational parameters in accordance with input from a human or artificial agent. For example, teleconnected container of the teleconnected containers 604 can include a thermostat configured to control an air conditioner to cool a container to a configurable temperature at a configurable time. As another example, an agent can specify an IoT device should not communicate with a specific data source, and the IoT device can be configured to refrain from communicating with the specific data source as part of purposeful configuration.

The teleconnected containers 604 include an interface device 610, a sensor suite 612, a sensor datastore 614, a sensor data analysis engine 616, and a mesh network engine 618. In an alternative (not shown), the teleconnected containers 604 can further include an environmental control engine suitable for adjusting the environment of the container. For example, a motion sensor stimulus could trigger a light to switch on, a door open sensor stimulus could trigger an audible alarm (potentially muted if the door is expected to be opened), and a temperature sensor stimulus could trigger a fire suppression system or air conditioner unit.

The interface device 610 is intended to represent one or more devices with wired or wireless interfaces through which the teleconnected containers 604 can send and receive data over wired or wireless connections. In a specific implementation, the interface device 610 includes a unique identifier, which is associated with the container in which the interface device 610 is attached, and which is used in the transmission of data through a network. Unique identifiers of the interface device 610 can include identifiers created in accordance with Internet Protocol version 4 (hereinafter referred to as "IPv4"), or identifiers created in accordance with Internet Protocol version 6 (hereinafter referred to as "IPv6"), of which both protocol versions are hereby incorporated by reference. Depending upon implementation-specific or other considerations, the interface device 610 can include applicable communication interfaces for receiving and sending data according to an applicable wireless device protocol. Examples of applicable wireless device protocols include Wi-Fi, ZigBee®, Bluetooth®, and other applicable low power communication standards. The interface device 610 can also include applicable communication interfaces for receiving and sending data utilizing a high power communication standard, such as one required for satellite communications.

In a specific implementation, the interface device 610 acts as a station. A station, as used in this paper, can be referred to as a device with a media access control (MAC) address, which can also be uniquely associated with the container to which the interface device 610 is attached, and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the interface device 610 is configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

The sensor suite 612 is intended to represent one or more sensors, sampling engines associated therewith, and a sensor control parameters datastore. The sensor suite 612 provides data to the sensor datastore 614 in accordance with control parameters in the sensor control parameters datastore and as dictated by the sampling engine that commands the sensors accordingly. In a specific implementation, sensor data is sampled in a manner that varies depending upon the sensor. For example, a thermometer may provide a continuous temperature reading but the sensor sampling engine may only store a reading in the sensor datastore 614 as dictated by the sensor control parameters datastore. In a specific implementation, the sensor control parameters datastore includes an alert threshold value; if the sensor suite 612 detects a stimulus that exceeds the alert threshold value, the sensor suite 612 may or may not sample at an increased rate.

The sensor datastore 614 is intended to represent data provided from the sensor suite 612. For the purposes of this paper, the sensor datastore 614 includes only such data as is intended to be recorded from the sensor suite 612 (and omits any sensor readings that are not captured). It may be noted, practically all sensor data could be captured, if desired, given adequate storage, but a second-by-second measurement of, e.g., temperature may be overkill.

The sensor data analysis engine 616 is intended to represent an engine that determines what of the sensor datastore 614 to provide to the container state datastore 606. Some aspects of sensor suite control can be considered part of the sensor data analysis engine 616, which can instruct the sensor suite 612 to adjust control parameters. The sensor data analysis engine 616 can operate to reduce the amount of data that is recorded in the container state datastore 606 by, for example, omitting temperature, humidity, or tilt angle readings for times at which the temperature, humidity, or tilt angle does not deviate or deviates by only a small margin. The sensor data analysis engine 616 can also store alerts in the container state datastore 606 for immediate or eventual transmission via the interface device 610.

The mesh network engine 618 is intended to represent an engine that works with the interface device 610 to detect other teleconnected containers 604. As used in this paper, a mesh network is intended to mean both a mesh network and any other contiguous ad hoc network that would not necessarily be characterized as a mesh network. A container is considered to be detectable (and proximate, if applicable) if messages from the container can be received using a low power communication standard, either directly or through a mesh or contiguous ad hoc network. Advantageously, the mesh network engine 618 can determine proximity for the purpose of organizing pickup of the teleconnected containers 604 when the containers are near one another. This reduces the risk a freight forwarder will show up to pick up a shipment only to find some containers are in a yard but others are still on a container ship.

In a specific implementation, the mesh network engine 618 operates to determine relative vertical location. For example, three teleconnected containers communicating with one another can use triangulation to determine vertical location, particularly if the teleconnected containers know of one another's geoposition. (Relatively vertical location can also be estimated when only two containers are communicating with one another, making triangulation, which assumes three containers, not strictly necessary.) Advantageously, this technique enables a person to figure out where in a stack of containers a particular container can be found.

In a specific implementation, the mesh network engine 618 coordinates a transmission hierarchy among the teleconnected containers 604. For example, one teleconnected container of a mesh could receive and compile the container state datastore 606 at a relatively centralized location from the disparate teleconnected containers of the mesh via a low power communication protocol and then transmit the container state data via a high power communication protocol, thereby limiting the use of battery to only one of the multiple containers. This technique can also be used when in areas where transmission quality is low, such as indoors, and the mesh network engine 618 can communicate with the mesh network engines of other containers in the mesh to determine which container has the best transmission quality (e.g., because it is near an opening).

Figure 7A:
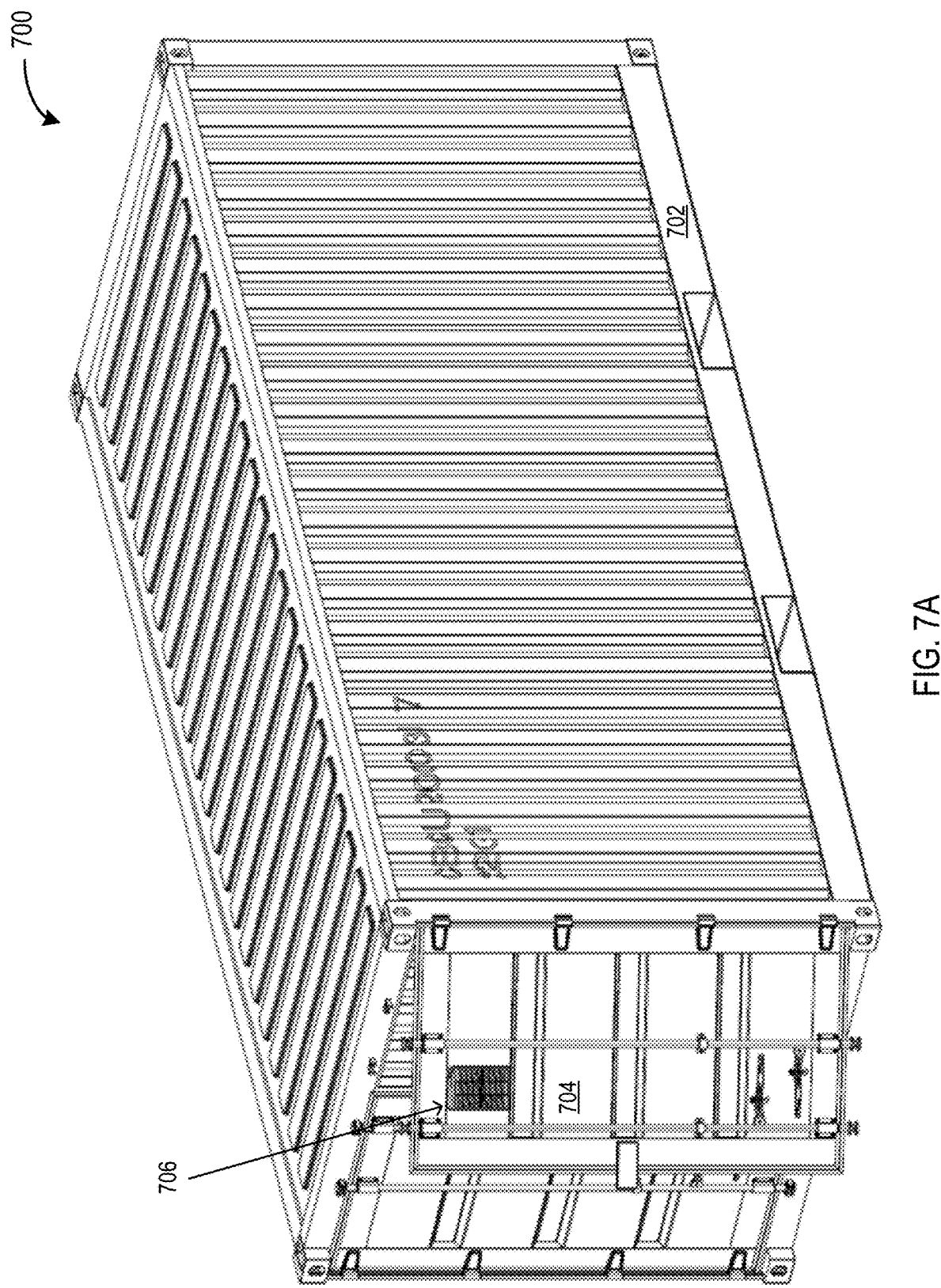
FIGS. 7A and 7B (collectively, FIG. 7) is a diagram of an example of an international regulation preauthorized (IRP) teleconnected intermodal container.
Figure 7B:
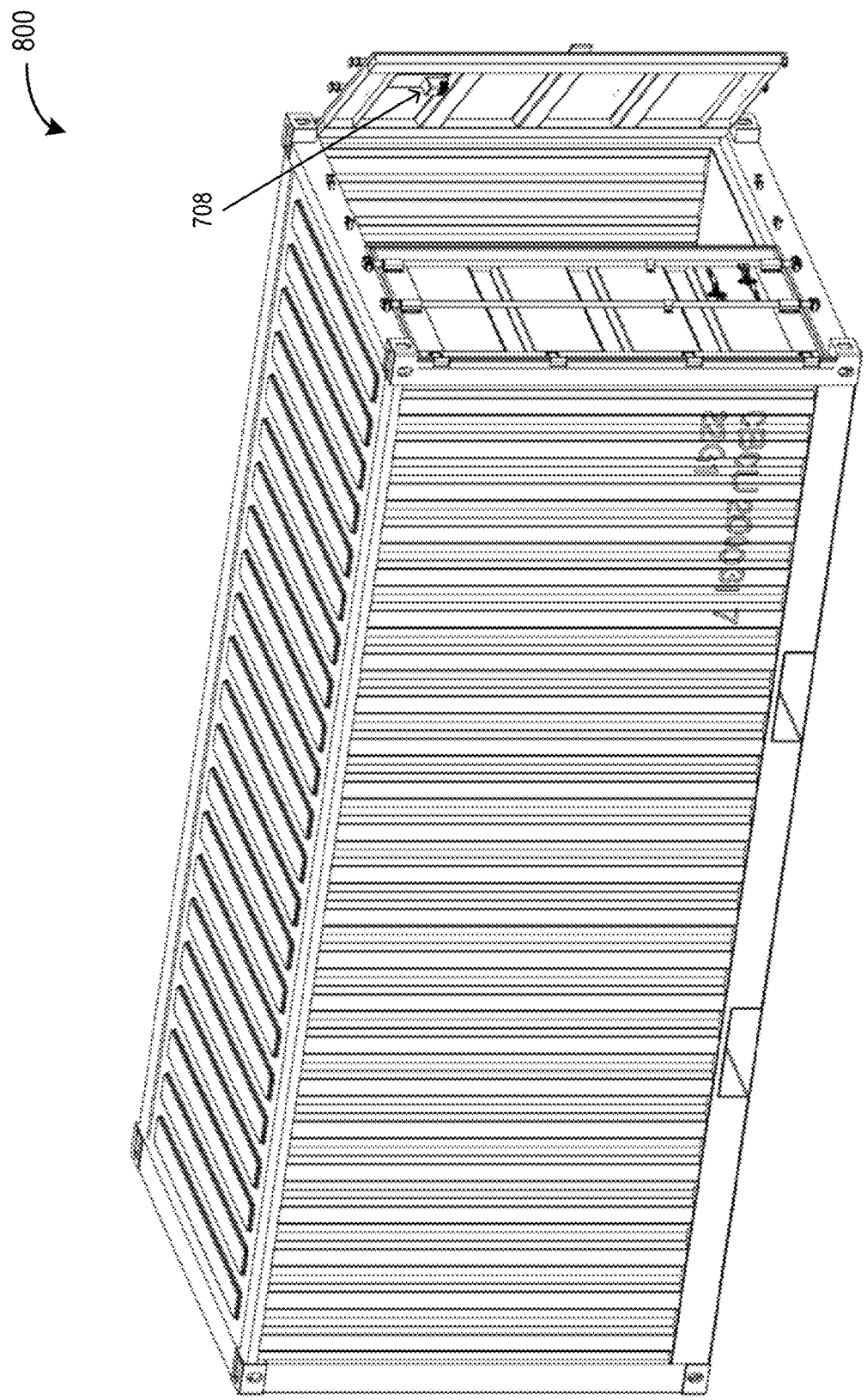

FIGS. 7A and 7B (collectively, FIG. 7) are diagrams 700A and 700B of an example of an international regulation preauthorized (IRP) teleconnected intermodal container 700. The IRP teleconnected intermodal container 700 includes a container body 702, a container door 704, an energy source device 706, and a teleconnectivity device 708.

Although the container body 702 is illustrated as having a particular shape, it should be understood the container body 702 can have the configuration of an applicable IRP container. In a specific implementation only, the container body 702 appears as depicted. The container body 702 is that of an intermodal container, though it should be understood techniques described in this paper are applicable to containers that would not necessarily be characterized as intermodal.

Although the container door 704 is depicted as having a particular shape and having a particular opening and locking mechanism, it should be understood the container door 704 can have the configuration of an applicable IRP container. The container door 704 is that of an intermodal container, though it should be understood techniques described in this paper are applicable to containers that would not necessarily be characterized as intermodal.

Advantageously, the container door 704 can include an electronic tag, identifier, or digital bar code (collectively referred to as a tag). Because the container door 704 includes the teleconnectivity device 708 (which in a specific implementation includes a device with an identifier, such as a MAC address), the tag does not have to be synched to the container 700. The installation of the container door 704 with the relevant integrated components is sufficient to provide an identifier for the container 700 for the life of the container 700 (or at least until the door or component is replaced, which will automatically resynch the container 700 via the new component). This is superior to, for example, an identifier that is literally printed on the container 700.

Advantageously, the container door 704 can include a sensor that detects when the door is open. Because the container door 704 includes the teleconnectivity device 708 (which in a specific implementation includes a door open sensor), a historical record of when a door is open can be retained. This is superior to, e.g., a plastic seal, that will only alert an individual that the door was open upon visual inspection.

Although the energy source device 706 is depicted as a solar panel with relevant underlying circuitry (not shown), it should be understood the energy source device 706 can be replaced with alternatives. Advantageously, the energy source device 706 is built into the door, which is useful for the purpose of achieving IRP because the containers must generally be presented for pre-approval without having additional attachments (and containers that are pre-approved and then have devices attached to them generally cannot be designated IRP). Instead or in addition, the energy source device 706 can include a shock-to-energy conversion device that converts shocks, which are relatively common when transporting containers, into a source of energy.

In a specific implementation, the energy source device 706 can include a non-recharging battery. Because containers have a relatively limited life expectancy of perhaps 7-10 years, it may be counterintuitive to provide a battery with a lifespan that lasts that long (though it may be possible to make such an implementation practical from both a cost and performance perspective). Advantageously, because the battery can be incorporated into the door, the door can be replaced, thereby replacing the battery and other components incorporated into the door when performing maintenance. In this way, the components integrated into the door need not have a lifespan of 7-10 years like the container body 702 is expected to have. That said, in a specific implementation, the energy source device 706 is designed with a life expectancy that is approximately the same as the container body 702, which can include renewable energy sourcing and/or by limiting radio transmissions from the connectivity device 708. Because the energy source device 706 can have energy harvesting components that do not rely upon external visibility (and batteries can be incorporated into the door itself, as well), the energy source device 706 can be implemented on the inside of the container door 704, as opposed to how it is depicted in the example of FIG. 7.

The connectivity device 708 is intended to represent a device that facilitates interconnectivity between the IRP teleconnected intermodal container 700 and a transparent container and transport disposition engine, such as the transparent container and transport disposition engine 112 (and/or other applicable engines). Advantageously, the connectivity device 708 is built into the door, which is useful for the purpose of achieving IRP because the containers must generally be presented for pre-approval without having additional attachments (and containers that are pre-approved and then have devices attached to them generally cannot be designated IRP). In the example of FIG. 7, the connectivity device 708 is built into the inside surface of the container door 704. Depending upon radio device characteristics and the difficulty with having radio signals pass through the container door 704, some of the components of the connectivity device 708, such as an antenna, can be built into a device that is visible from the outside of the container, though in a specific implementation no such components are externally apparent.

In a specific implementation, the connectivity device 708 includes one or more radio transmitters and one or more radio receivers (collectively, a transceiver). It should be understood some techniques described in this paper can be accomplished with only a receiver or only a transmitter. As such, the connectivity device 708 can be characterized as having a radio transmitter, a radio receiver, or a radio transceiver. Also, although radio is ubiquitously used for communications, some techniques described in this paper can be accomplished using some form of transceiver other than radio. As such, the connectivity device 708 can be characterized as having a transmitter, a receiver, or a transceiver.

In a specific implementation, the connectivity device 708 can be configured to send transmissions in accordance with a heartbeat protocol. The transmission frequency of a heartbeat protocol can be adjusted based upon expected location (e.g., if the container 700 is in the middle of the ocean, the heartbeat might be slower than if the container 700 is nearing a geofence). Advantageously, tuning the heartbeat to reduce transmissions can preserve battery life. In a specific implementation, the connectivity device 708 is configured to communicate with other containers (via their connectivity devices). Advantageously, the heartbeat protocol can be implemented such that one container speaks on behalf of other containers within range of a low power radio transceiver. In this way, relatively high power heartbeat messages can be sent via satellite transmissions by less than all of the containers within low power radio communication range.

In a specific implementation, the connectivity device 708 includes a sensor suite and sensor datastore, such as the sensor suite 612 and sensor datastore 614 described with reference to FIG. 6, that are used to collect data associated with conditions within (or external conditions detectable within) the container 700 and send transmissions in accordance with a quality of care protocol. The quality of care protocol can designate alerts as having a number of different alert levels but for the sake of brevity the quality of care protocol designates sensor data as uninteresting (e.g., routine, potentially erroneous, or otherwise uninteresting), of historical relevance, alert, or high alert. Uninteresting sensor data is eventually overwritten. Sensor data of historical relevance is retained until transmission can be made in a resource-conservative manner. Alerts are retained until transmission can be made in accordance with a quality of service threshold. High alerts are transmitted immediately, either by high power radio from the container itself or low power radio to another container that sends alerts on behalf of multiple interconnected containers. The quality of service threshold can be adjusted depending upon preferences (e.g., a customer might be willing to pay more for more frequent alerts, items withing the container may be more susceptible to damage from shocks or moisture so alerts related to such conditions can be considered more pertinent, or the like). The quality of care protocol need not have one or more of these alert levels and could have more.

What is claimed is:

1. A system comprising:
   a carrier device associated with a carrier;
   a cargo endpoint device associated with a shipper, wherein the carrier device and cargo endpoint device are configured to facilitate a connection between the carrier and the shipper;
   a carrier datastore for storing data about the carrier;
   a shipper datastore for storing data about the shipper;
   a recipient datastore for storing data about a recipient;
   a container datastore for storing container and transport parameters;
   a third party datastore with contact information for third parties, wherein third parties include freight forwarders;
   a mode/route datastore with data regarding timing and costs associated with known transportation channels;
   a contract datastore including applicable container and transport parameters for a shipment;
   a container and transport parameter provisional allocation engine, coupled to the container datastore, third party datastore, mode/route datastore, and contract datastore to provisionally allocate teleconnected containers in consideration of upcoming responsibilities in association with a shipment, using the container datastore, third party datastore, mode/route datastore, and contract datastore;
   teleconnected containers, wherein each of the teleconnected containers includes a wireless transmitter built into a door of the teleconnected container;
   a transparent container and transport parameter disposition engine for converting provisional allocations to actual allocations;
   a transport state datastore;
   a container state datastore;
   a freight forwarding oversight engine that uses the transport state datastore, the container state datastore, and the wireless transmitters built into the doors of the teleconnected containers to resolve outstanding issues related to freight forwarding;
   a container maintenance engine that determines whether a container of the teleconnected containers is to be retired or maintenance is to be performed;
   wherein an initial transport parameter state is a pre-pickup state that includes an identified set of allocated containers, an identified transport for taking the allocated set of containers to a pick up location, and a contracted handoff window or time;
   wherein the pre-pickup state includes a first sub-state for idleness and a second sub-state for a countdown to a predicted state change from an allocated pre-pickup state to a containers on transport state.

2. The system of claim 1, wherein the container and transport parameter provisional allocation engine provisionally allocates an intermodal container when it is determined that the contracted route calls for multimodal freight handling.

3. The system of claim 1, wherein the container and transport parameter provisional allocation engine provisionally allocates an international regulations preauthorized (IRP) container when it is determined that a contracted route of the shipment requires passing through customs.

4. The system of claim 3, wherein the transparent container and transport parameter disposition engine updates provisional allocations of containers with containers throughout freight handling of the shipment.

5. The system of claim 1, wherein the transparent container and transport parameter disposition engine updates provisional allocations of containers with containers that are available for allocation.

6. The system of claim 1, wherein the pre-pickup state includes sub-states selected from a group consisting of provisionally allocated, allocated, containers loaded onto transport, on route to pick up location, arrived, loading, departing, idle, and multiple ones of these.

7. The system of claim 1, wherein an initial container state is a state of containers prior to or at a time cargo is handed off from the shipper to the carrier, wherein container state is recorded in the container datastore.

8. The system of claim 1, wherein the container datastore accumulates container state data that has not yet been transmitted to the container and transport state parameters disposition engine.

9. The system of claim 1, wherein the outstanding issues related to freight forwarding include freight forwarding timing and accrued late fees.

10. The system of claim 1, further comprising a national customs office device.

* * * * *